United States Patent [19]

Jennings et al.

[11] Patent Number: 5,122,593

[45] Date of Patent: * Jun. 16, 1992

[54] STABILIZED GAMMA-IRRADIATABLE POLYPROPYLENE FIBERS AND STERILIZABLE ARTICLES THEREOF

[75] Inventors: Eileen Jennings, Lakewood; John T. Lai, Broadview Heights, both of Ohio

[73] Assignee: The B. F. Goodrich Company, Akron, Ohio

[*] Notice: The portion of the term of this patent subsequent to Oct. 25, 2005 has been disclaimed.

[21] Appl. No.: 313,700

[22] Filed: Feb. 22, 1989

[51] Int. Cl.$^5$ .................... C08K 5/3477; A61L 2/00
[52] U.S. Cl. .................... 524/100; 422/22; 522/75
[58] Field of Search ............ 422/22; 522/75; 524/100

[56] References Cited

U.S. PATENT DOCUMENTS 4,780,495 10/1988 Lai et al. ............... 524/100
4,797,438 1/1989 Kletecka et al. ........... 524/100

FOREIGN PATENT DOCUMENTS 2043079 2/1980 United Kingdom .

OTHER PUBLICATIONS

"Stabilizers in Gamma-Irradiated Polypropylene", by Horng, P. and Klemchuk, P., Plastics Engineering, Apr. 1984, pp. 35-37.
"Recent Developments in the Oxidative Degradation of Polypropylene by Gamma Radiation", by Wiles, D. M. and Carlsson, D. J.

Primary Examiner—Kriellion S. Morgan
Attorney, Agent, or Firm—Alfred D. Lobo

[57] ABSTRACT

Excellent stabilization of polypropylene (PP) fibers exposed to sterilization levels of gamma radiation, is obtained with a hybrid stabilizer having a N-(substituted)-1-(piperazin-2-one alkyl) group at one end and a (3,5-dialkyl-4-hydroxyphenyl)-$\alpha,\alpha$-disubstituted acetamide at the other. When this hybrid of a hindered amine with a hindered phenol is combined through a disubstituted alpha carbon atom of the acetamide in a single molecule, it affords the advantages of each group with respect to its stabilization against oxidation, but without the known inherent disadvantages of either group. This molecule is N-(substituted)-1-(piperazin-2-one alkyl)-$\alpha$-(3,5-dialkyl-4-hydroxyphenyl)-$\alpha,\alpha$-substituted acetamide molecule ("3,5-DHPZNA" for brevity). When the hybrid stabilizer is incorporated into PP fibers which are exposed to gamma irradiation, the PP fibers exhibit only a barely noticeable discoloration, yet are inculcated with a unique property: though exposed to 4 Mrad of gamma radiation, the PP fibers suffer essentially no loss of their original, pre-irradiated tensile strength after about seven months at 60° C. in an oven. This property is atypical of PP fibers stabilized with several other hindered phenols and hindered amines tested. The unexpected retention of tensile strength in 3,5-DHPZNA stabilized PP fibers used in articles exposed to a sterilizing dosage level of gamma radiation, is of great practical value. Particularly in such articles as clothing and household goods made from woven or non-woven fabrics of dyed or pigmented PP fibers, in which goods slight discoloration is acceptable, this invention is of commercial importance.

10 Claims, No Drawings

STABILIZED GAMMA-IRRADIATABLE POLYPROPYLENE FIBERS AND STERILIZABLE ARTICLES THEREOF

BACKGROUND OF THE INVENTION

The present invention relates to fibers of polypropylene, and copolymers of propylene with a minor amount of a copolymerizable alpha-olefin monomer X (P-co-X), for example ethylene (P-co-E), stabilized against degradation by gamma-radiation. Fibers of polypropylene and such copolymers, individually and collectively referred to herein as "propylene polymer fibers" (PP fibers), upon exposure to gamma-radiation without being stabilized, develop objectionable color and lose their desirable physical properties because of degradation. More particularly, the invention relates to stabilized PP fibers, and to woven and non-woven articles made from PP fibers, before and after they are exposed to a preselected level of gamma-radiation.

Recent advances in PP technology have been instrumental in propagating the use of the polymer for shaped articles for a wide variety of uses. The chemical inertness and lack of toxicity of PP fibers, their low weight, and the relatively low cost of producing such articles of arbitrary size and shape, makes the PP fibers peculiarly well-adapted for use in the medical and institutional maintenance fields. Thus, PP is the material of choice for laboratory filtration fabric, and a variety of disposable articles including curtains, bedsheets, surgical gowns and the like. Such articles, stabilized with hindered phenols, were routinely sterilized with ethylene oxide but its toxicity resulted in its gradual withdrawal as a sterilant. Ethylene oxide has been replaced by exposure to gamma radiation having an energy level in the range from about 0.5 to about 5 Mrad (megarads) for a short period of time, from about 1 min (minute) to about 12 hr (hours), the higher the intensity of radiation, the shorter the time required.

The problem is that PP fibers degrade rapidly when so sterilized, developing an objectionable yellow color, and suffering a severe loss of physical integrity, the higher the intensity of radiation, the worse the degradation. The degradation, referred to as "oxidative degradation", is particularly noticeable upon storage of a sterilized article at room temperature, the longer the storage period, the worse the degradation.

Considerable effort has been devoted, in the recent past, to the study of the details of the mechanisms and kinetics of the oxidation, with the expectation that such understanding will lead to the correct choice of an effective stabilizing additive (stabilizer) which will control the chemistry responsible for degradation. In an article titled "Recent Developments in the Oxidative Degradation of Polypropylene by Gamma Radiation" by Wiles, D. M. and Carlsson, D. J., theoretical equations are presented to explain the mechanisms and kinetics. They concluded that gamma radiation of PP results in thermal oxidation which is qualitatively very similar to oxidation induced by other means, e.g. to photo-oxidation. The same reactive species are involved and although they will be distributed rather differently, the same oxidation products are formed. Affirmation of this conclusion is provided by the improved gamma-radiation stability of PP stabilized with conventional hindered phenols, but at the expense of highly visible and undesirable discoloration.

The difference in the frequency of the wavelengths of uv light and gamma radiation, coupled with the great difference in their energy levels, makes their relative effects upon a polymer unpredictable. The differences go far deeper than the expected differences relating to their relative penetration into the polymer, as evidenced by the fact that some structurally similar compounds are far less effective stabilizers than others which appear to have all the necessary perquisites of the more effective stabilizers.

Notably, the effects of gamma radiation on PP are readily distinguishable over the effects of such radiation on other polymers (polystyrene "PS", say). PS has been found to be more stable (see "Stabilizers in gamma-irradiated polypropylene" by Horng, P. and Klemchuk, P., *Plastics Engineering* April '84, pp 35-37), as are several other polymers. They concluded that the high susceptibility to gamma-degradation decreed that the fate and effectiveness of stabilizers can only be assessed by determining whether they are being consumed in the irradiation process or being simply decomposed by gamma radiation. Further, they developed an experimental technique to evaluate the stability of four major genera of additives, namely an antioxidant (AO) such as tetrakis[methylene(3,5-di-tert-butyl-4-hydroxyhydrocinnamate)]methane, a hindered amine (HA) such as 2,2,6,6-tetramethyl-4-piperidyl sebacate, a phosphite such as tris(2,4-di-tert-butyl phenyl)phosphite, and a thioester such as distearyl thiodipropionate. Their study indicated that the mechanical and molecular weight data confirmed that the residual AO or HA in the irradiated PP maintained the physical integrity of the samples by reacting with the propagating radicals and/or by decomposing peroxides. The phosphite and thioester additives were less effective because they behaved as secondary stabilizers and were completely consumed during radiation. But, they offered no basis for choosing an effective HA or AO, other than by repetitive trial and error.

Tests with various HAs for color development in gamma-irradiated PP showed that HA alone did not cause significant discoloration and was the leading choice for medical end-products which were color or appearance-sensitive. Thus, HA was the best overall stabilizer for PP gamma-sterilizable products. Again, however, there is nothing to indicate how to choose the more effective among HAs, other than trial and error.

Yet, British Patent GB 2,043,079 discloses that PP was stabilized against gamma-radiation by incorporating a phenolic AO containing an isocyanurate group, preferably in conjunction with a thiosynergist and a stearate, clearly contradicting the foregoing conclusions. However, there is no indication as to the extent of discoloration suffered.

Of particular interest is the peculiar gamma-stabilization effect of N-(substituted)α-(3,5-dialkyl-4-hydroxyphenyl)-α,α-disubstituted acetamides in which one of the substituents on the N atom is a 2-piperazinone group. More correctly, the compounds are "N-(substituted)-1-(piperazin-2-one alkyl)-α-(3,5-dialkyl-4-hydroxyphenyl)-α,α-substituted acetamides", which are hereinafter referred to as "3,5-DHPZNA" for brevity. This 3,5-DHPZNA stabilizer is disclosed in U.S. Pat. No. 4,780,495 to John T. Lai, for its uv-light stabilization in PP, and, because of the presence of a polysubstituted piperazinone (PSP) group in the molecule, was tested in PP plaques for such gamma-ray stabilization effectiveness as it might have. The plaques deteriorated rapidly.

Since the majority of PP articles are extruded or molded shapes other than fibers, most testing for gammaray stabilization is conventionally done with plaques, not fibers, because plaques are more conveniently prepared. Generally, if a stabilizer is effective in fibers it is effective in plaques, but the opposite is not true. It was only by chance that the gamma-ray stabilization of 3,5-DHPZNA was also tested in PP fibers, or its effectiveness in this particular application would have gone unnoticed. It is not known why PP fibers are stabilized with 3,5-DHPZNA against gammas far more effectively than are PP plaques, but PP fibers are. Moreover, 3,5-DHPZNA-stabilized PP can be extruded from a spinneret without the aid of another stabilizer for antioxidation protection. Which is why 3,5-DHPZNA is the sole stabilizer of choice for woven and non-woven goods made with PP fibers.

U.S. Pat. No. 4,797,438 to Kletecka et al discloses that hindered amines with a specific structure known to exhibit excellent uv stabilization in numerous host polymers without notably distinguishing one polymer from another as far as their relative susceptibility to uv stabilization is concerned, are surprisingly effective to stabilize PP against degradation by gamma-radiation. Moreover, such stabilization extends to articles of arbitrary shape, including fibers, and these amines are more effective when used without an AO, phosphite or thioester. It was known, however, that PP fibers stabilized with commercially available hindered phenol AOs such as Goodrite ® 3114 effectively withstood sterilization with gammas, albeit with high discoloration. It appeared that the presence of an AO did little more than contribute to the undesirably high level of discoloration known to be associated with AO-stabilized PP which is sterilized with gamma radiation.

The peculiarly distinguishing structural feature of the stabilizers in the Kletecka et al composition, is that they, like 3,5-DHPZNA, contain as an essential portion of their basic structure, a PSP having an $N^1$-adjacent carbonyl in the PSP group, and at least the $C^3$ (carbon atom in the 3-position in the ring) has two substituents (hence "polysubstituted or substituted"), which may be cyclizable, that is, form a cyclic substituent. But unlike 3,5-DHPZNA, those stabilizers do not contain a hindered phenol group in the same molecule.

Though 3,5-DHPZNA compounds referred to in the aforementioned '495 Lai patent were known to be excellent UV stabilizer in colorless organic materials when used in combination with antioxidants, there was nothing to suggest that its incorporation in PP, alone among other polymers tested, in the absence of any conventional hindered phenol antioxidant, and preferably also in the absence of a phosphite or thioester stabilizer, would provide effective stabilization against gamma-radiation.

SUMMARY OF THE INVENTION

It has been discovered that N-(substituted)-1-(piperazin-2-one alkyl)-α-(3,5-dialkyl-4-hydroxyphenyl)-α, α-disubstituted acetamide, namely 3,5-DHPZNA, having a N-(substituted)1-(piperazine-2-one alkyl) group at one end and a (3,5-dialkyl-4-hydroxyphenyl)-α,α-disubstituted acetamide at the other, provides a hybrid stabilizer combining a hindered amine with a hindered phenol through a disubstituted alpha carbon atom of the acetamide in a single molecule. When this hybrid is incorporated into fibers of polypropylene or predominantly propylene-containing copolymers (together referred to as "PP fibers" herein), the hybrid affords the advantages of each group and minimizes the discoloration typically generated by the hindered phenol group; further, that irradiated woven or non-woven articles made from PP fibers stabilized with such a hybrid, have improved strength and discoloration resistance, compared to similarly irradiated articles made from PP stabilized with several other commercially available hindered amines tested.

It has also been discovered that 3,5-DHPZNA in dyed or pigmented PP fibers, effectively masks the slight discoloration attributable to degradation of PP fibers, when the fibers are irradiated with a 4.0 Mrad dose of gamma rays, if the 3,5-DHPZNA is used in an amount in the range from about 0.1 to about 5 phr in PP fibers.

It is therefore a general object of this invention to provide PP fibers which have been stabilized against gamma radiation with an effective amount of the 3,5-DHPZNA stabilizer sufficient to stabilize the fibers so that, after irradiation with a 4.0 Mrad dose of gamma rays, they do not lose more than 50% of their original tensile strength after about six months in a 60° C. oven.

It is also a general object of this invention to provide a method for imparting improved strength and discoloration resistance to stabilized, gamma-irradiated PP fibers, which method comprises incorporating into said PP fibers containing no conventional hindered phenol antioxidant, an effective amount of a hybrid stabilizer containing PSP and 3,5-dialkyl-4-hydroxy phenyl moieties combined in a single molecule, said amount being sufficient to decelerate oxidative degradation of the PP fibers.

It is a specific object of this invention to provide a method for sterilizing articles made from woven and nonwoven PP fibers, which method comprises, subjecting said PP fibers to gamma radiation in an amount sufficient to sterilize the fibers; said PP fibers having incorporated therein from 20 parts per million (ppm) to about 2.0% of 3,5-DHPZNA, preferably from 0.1% to 0.5%, based upon the weight of the PP in the fibers, in the absence of a hindered phenol antioxidant.

It is another general object of this invention to provide woven and non-woven articles, made from PP fibers and subjected to a dose of gamma-radiation, with improved strength and discoloration resistance, provided the PP has incorporated therein a 3,5-DHPZNA stabilizer, in an effective amount, sufficient to decelerate oxidative degradation of the PP fibers.

DETAILED DESCRIPTION OF PREFERRED EMBODIMENTS

In a particular embodiment, this invention provides an article of woven or non-woven PP fibers in a fabric made from PP, which article is sterilizable by gamma-radiation from a cobalt-60 source. Non-woven fabrics of PP may have a carded fiber structure or comprise a mat in which the fibers or filaments are distributed in a random array. The fibers may be bonded with a bonding agent such as a polymer, or the fibers may be thermally bonded without a bonding agent. The fabric may be formed by any one of numerous known processes including hydroentanglement or spun-lace techniques, or by air laying or melt-blowing filaments, batt drawing, stitchbonding, etc. depending upon the end use of the article to be made from the fabric.

Incorporated in the polymer, and preferably uniformly distributed therein before it is made into filaments, is a small amount, from about 20 ppm to about 2.0% by weight (based on the weight of all the polymer from which the article is formed), and more preferably from about 0.1 phr to about 0.5 phr, of a N-(substituted)-1-(piperazin-2-one alkyl)-α-(3,5-dialkyl-4-hydroxyphenyl)-α,α-substituted acetamide (3,5-DHPZNA). Details for preparation of numerous substituted acetamides having the 3,5-DHPZNA moiety are disclosed in the aforementioned '495 Lai patent, the disclosures of which are incorporated by reference thereto as if fully set forth herein.

The 3,5-DHPZNA structure is found in a stabilizer which combines a hindered phenol AO and a hindered amine PSP moiety in the same molecule, and acid addition salts of 3,5-DHPZNA which is represented by the structure:

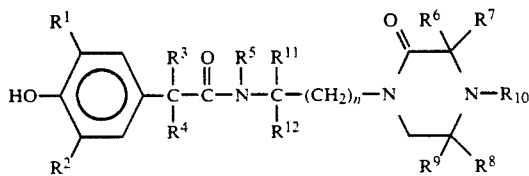

wherein, $R^1$, $R^2$ and $R^5$ each represent hydrogen, $C_1-C_{12}$ alkyl, phenyl, naphthyl, $C_4-C_{12}$ cycloalkyl, and, alkyl-substituted cycloalkyl, phenyl and naphthyl, each alkyl substituent being $C_1-C_8$, and at least one of $R^1$ and $R^2$ is $t-C_4-C_{12}$ alkyl;

$R^3$ and $R^4$ independently represent $C_1-C_{18}$ alkyl, and $C_5-C_{12}$ cycloalkyl, phenyl and naphthyl, and, alkyl-substituted cycloalkyl, phenyl and naphthyl, each alkyl substituent being $C_1-C_8$, and, when together cyclized, $R^3$ with $R^4$ may represent $C_4-C_{12}$ cycloalkyl, and $C_1-C_8$ alkyl-substituted cycloalkyl;

$R^6$, $R^7$, $R^8$ and $R^9$ each represent $C_1-C_{12}$ alkyl, or, when together cyclized, $R^6$ with $R^7$, and $R^8$ with $R^9$, may represent $C_4-C_{12}$ cycloalkyl, and $C_1-C_8$ alkyl-substituted cycloalkyl;

$R^{10}$ is selected from the group consisting of hydrogen, $C_1-C_8$ alkyl and

wherein $R^{13}$ represents hydrogen, $C_1-C_{18}$ alkyl or alkenyl, phenyl or naphthyl;

$R^{11}$ and $R^{12}$ independently represent hydrogen and $C_1-C_{18}$, alkyl; and, n is an integer in the range from 1 to about 8.

Specific examples of such 3,5-DHPZNA stabilizers are identified by the following code numbers and structures in which $CH_2$ groups at the intersection of lines are not otherwise identified, and projecting lines represent $CH_3$ groups.

The substituents on the alpha-C atom of the acetamide are critical in the above-identified stabilizer compound.

It will be appreciated that when $R^{10}$ is to be acyl, it is introduced by an acylation step after formation of the 3,5-DHPZNA in which there is no substituent on the $N^4$ atom of the diazacycloalkane ring.

The process for preparing the foregoing 3,5-DHPZNA compounds comprises reacting a 2,6-dialkylphenol with at least an equimolar quantities of an aliphatic, cycloaliphatic or alkaryl ketone and a 4-amino-polysubstituted piperazine or 4-amino-polysubstituted piperazin-2-one in the presence of an alkali metal hydroxide, preferably at a temperature in the range from about $-10°$ C. to about 50° C.

The 2,6-dialkylphenol reactant is represented by the structure

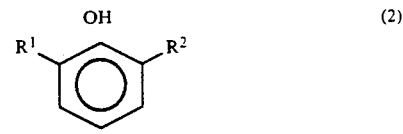

wherein $R^1$ and $R^2$ have the same connotations set forth hereinabove.

The 4-amino-polysubstituted piperazin-2-ones are N-substituted cyclic alkyleneimines represented by the structure

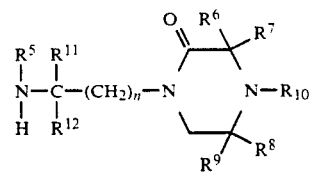

wherein $R^5$, $R^6$, $R^7$, $R^8$, $R^9$ and $R^{10}$ have the same connotation as that given hereinbefore. Two or more of the 4-amino-polysubstituted piperazinone moieties may be present on a single molecule, for example, when the moiety is a substituent in each of the two primary amine groups of an alkane diamine; or, of a triamine or tetramine.

The 3,5-DHPZNA is then produced by the ketoform reaction. As before, at least a stoichiometric amount of the 4-amino-polysubstituted piperazine is used, relative to the amount of 2,6-dialkylphenol, an excess of amine being preferred for good yields. Most preferred is up to a four-fold excess.

The ketone reactant may be a dialkylketone, a cycloalkanone, or alkylcycloalkanone, represented by the structure

wherein, $R^3$ and $R^4$ are independently selected from $C_1-C_8$ alkyl.

The 3,5-DHPZNA product is readily isolated from the reaction mass by filtration, and washing the filtrate with aqueous inorganic acid, typically HCl or $H_2SO_4$. The filtrate is dried with a desiccant such as sodium sulfate, then heated to dryness. The product obtained may be recrystallized from a solvent if greater purity is desired. Additional details relating to the procedures for preparing and recovering the compounds are found in the aforementioned '495 Lai patent. Illustrative examples of 3,5-DHPZNA stabilizers are:

(1)   N-isopropyl-N-[2-(2-keto-3,3,5,5-tetramethyl-1-piperazinyl)ethyl]-2-(3,5-di-t-butyl-4-hydroxyphenyl)-2-methyl propanamide represented by the structure

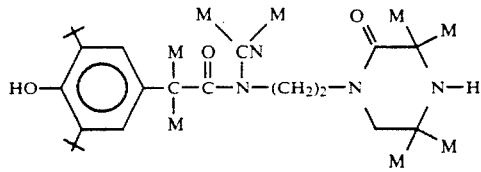

+ = t-butyl    M = methyl (2) N-[1-(2-keto-3,3,5,5-tetramethyl-1-piperazinyl-2-methyl-2-propyl]-2-(3,5-di-t-butyl-4-hydroxyphenyl)-2-methyl-propanamide represented by the structure

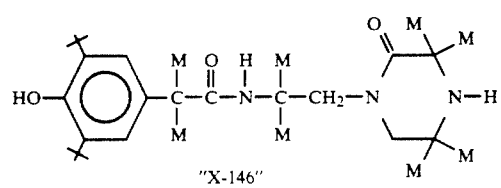

"X-146"

(3) N-[1-(2-keto-3,5,5-trimethyl-3-ethyl-1-piperazinyl-2-methyl-2-propyl]-2-(3,5-di-t-butyl-4-hydroxyphenyl)-2-methyl-butanamide represented by the structure

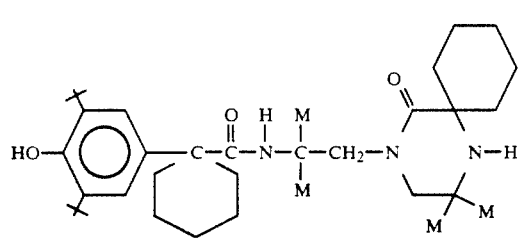

E = ethyl (4) N-[1-(2-keto-3,3-pentamethylene-5,5-dimethyl-1-piperazinyl)-2-methyl-2-propyl]-2-(3,5-di-t-butyl-4-hydroxyphenyl)-2,2-pentamethylene acetamide represented by the structure

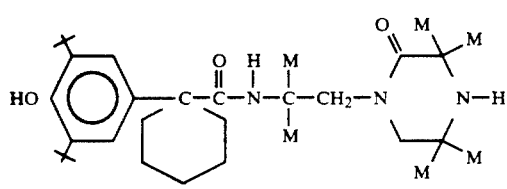

(5) N-[1-(2-keto-3,3,5,5-tetramethyl-1-piperazinyl-2-methyl 2-propyl]-2-(3,5-di-t-butyl-4-hydroxyphenyl)-2,2-pentanethylene acetamide represented by the structure

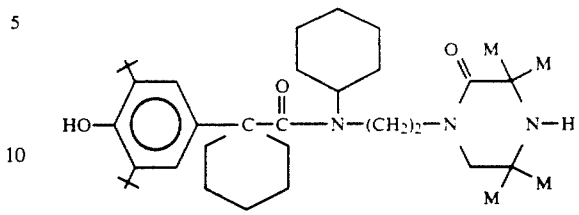

(6) N-cyclohexyl-N-[2-(2-keto-3,3,5,5-tetramethyl-1-piperazinyl ethyl]-2-(3,5-di-t-butyl-4-hydroxyphenyl)-2,2-pentamethylene acetamide represented by the structure

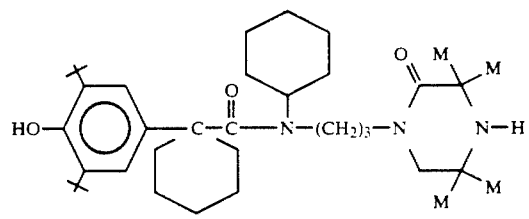

(7) N-cyclohexyl-N-[3-(2-keto-3,3,5,5-tetramethyl-1-piperazinyl propyl]-2-(3,5-di-t-butyl-4-hydroxyphenyl)-2,2-pentamethylene acetamide represented by the structure

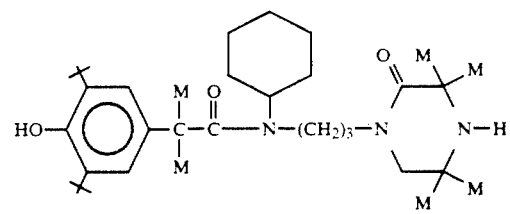

(8) N-cyclohexyl-N-[3-(2-keto-3,3,5,5-tetramethyl-1-piperazinyl-propyl]-2-(3,5-di-t-butyl-4-hydroxyphenyl)-2-methyl propanamide represented by the structure

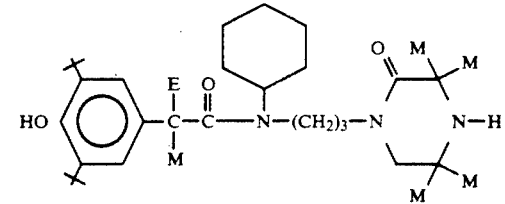

(9) N-cyclohexyl-N-[3-(2-keto-3,3,5,5-tetramethyl-1-piperazinyl-propyl]-2-(3,5-di-t-butyl-4-hydroxyphenyl)-2-methyl butanamide represented by the structure The propylene polymer is typically polypropylene homopolymer, but may be a random or block copolymer of propylene and a monoolefinically unsaturated monomer X, (P-co-X) with up to about 30% by wt of X wherein X represents vinyl acetate, or a lower $C_1$-$C_4$ alkyl acrylate or methacrylate. Blends of such propylene polymers with other polymers such as polyethylene are also included within the scope of this invention. For convenience, homopolymer PP and copolymer P-co-X are together referred to herein as "propylene polymer" PP. The PP has a number average mol wt $M_n$ in the range from about 10,000 to about 500,000, preferably about 30,000 to about 300,000 with a melt flow index from 0.1 to 30 g/10 min when measured according to ASTM D-1238.

Though prior art stabilized polyolefins may include an impact modifier, there is no impact modifier in the stabilized propylene polymer used to thermoform our article. The use of impact modifiers help stabilize the propylene polymer by desensitizing it, but conventional impact modifiers, for example, ethylene-propylene-diene terpolymer rubber, styrene-butadiene-styrene block copolymers, and the like, are highly undesirable from the standpoint of color.

For the same reason, namely, the contribution of known antioxidants to color, our stabilized propylene polymer is free of an antioxidant, though prior art compositions utilize them to enhance stability to gamma-radiation.

Solely for the purpose of facilitating the injection molding, or other thermoforming operation, of the propylene polymer, a metal stearate such as calcium or zinc stearate in an amount insufficient to deleteriously affect the color of the propylene polymer, preferably in the range from about 10 ppm to about 150 ppm, may be blended into the PP.

Since a predominant concern is not color, it is most preferred that some pigment be added to the normally water white propylene polymer which upon exposure to 4.0 Mrad of gamma radiation has a slightly greyish cast. When color is desired, for example, blue, a phthalocyanine pigment may be added in an amount sufficient to provide the desired color, but insufficient adversely to affect the stabilization provided by the 3,5-DHPZNA stabilizer.

The 3,5-DHPZNA stabilizer may readily be incorporated into the PP by any conventional technique at a convenient stage prior to the manufacture of shaped articles from the PP. For example, the stabilizer may be mixed with the PP in dry powder form, or a suspension or emulsion of the stabilizer may be mixed with a solution, suspension, or emulsion of the polymer.

Though the preferred stabilized PP has no antioxidant added to it and is essentially free of antioxidant, a small amount, less than about 50 ppm of AO, will not make a sufficiently noticeable adverse contribution towards color upon being irradiated, and is tolerable. Such a small amount of antioxidant may be present in commercially available antioxidant-free PP, added thereto for the purpose of facilitating its manufacture. Additives other than an antioxidant, may be added if they do not adversely affect the desired color, or help degrade the physical properties of the gamma-irradiated PP. Such additives may include lubricants in addition to alkaline earth metal stearates, near-colorless or white fillers such as glass fibers or talc, and optical brighteners.

Articles of sterilizable propylene polymer most likely to benefit from sterilization by gamma-radiation, are curtains, sheets, gowns, hoods, dust covers for equipment, and netting of all types, all of which, once placed in service, are not likely to be used for more than a few weeks, and at most a few months, before they are discarded.

If articles of water white PP fibers are exposed to a 4.0 Mrad dose of gamma rays, discoloration (yellowing) is usually evident immediately after irradiation. Less evident is the degradation of physical properties which typically develop with time, particularly upon aging at room temperature or above.

In the following Table are listed the results obtained in a side-by-side comparison of the stabilizing effectiveness against gamma radiation at a level of 4.0 Mrads, using several commercially available stabilizers and the X-146. Each of the commercial stabilizers contains one or more hindered piperidinyl groups, and in Chimasorb 944 and Cyasorb 3346 the piperidinyl groups are associated with triazine rings.

The blank contained only 0.1 phr Goodrite 3114, known to be a highly effective antioxidant, but not an effective gamma stabilizer. It will be appreciated that the fiber will not survive the spinning conditions without any antioxidant at all. In each of the other samples, the identified stabilizer was used at a level of 0.2 phr in 1 Kg of Profax 6301 polypropylene (lot #63759). The resin and stabilizer were mixed with 0.1 phr calcium stearate in paper bags to avoid the high-shear mixing of a Henschel mixer until a uniform mixture was obtained. The mixture was then pelletized, spun and drawn using the following procedure. The tensile strength before exposure to gammas and oven aging, is measured and recorded as the "original" tensile strength. Thereafter, the samples are exposed to gammas as described below and tested every three days until 50% of the original tensile strength is lost.

PROCEDURE

Skeins of fiber, each skein containing 0.2 phr of a stabilizer, were then irradiated at 0.5 Mrad per hr for 8 hr so that each sample is exposed to 4.0 Mrad. The 4.0 Mrad level was chosen because it is a favored sterilization level for hospital gowns, bed sheets, curtains and the like. At this relatively severe radiation level most commercially available stabilizers provide very little protection for PP fibers.

It was observed that, before irradiation, all skeins were essentially free of color, presenting a snow-white appearance to the naked eye. Immediately after irradiation, there is a distinct grey cast to all skeins, some much darker than the others. The color associated with X-146 is a light grey. The skeins, both those not exposed to gammas as well as those which were, are hung in a 60° C. convection oven through which ambient air is circulated with the help of a fan. Samples from these skeins were tested for tensile every three days, until the measurement showed a 50% loss from the original tensile. The data presented are the averages of four samples from each of the skeins. The specific 3,5-DHPZNA tested below is the one designated X-146.

TABLE 1

| identif. | days to 50% loss of original tensile at 60° C. | |
|---|---|---|
| | non-irradiated | 4.0 Mrads |
| blank (0.1 phr 3114*) | 334 | 33 |
| Chimassorb 944 | 337 | 119 |
| Cyasorb 3346 | 360 | 98 |
| X-146 | 232 | 225 |
| Mixxim 57 | 328 | 139 |
| Mixxim 68 | 324 | 124 |

*no antioxidant in the remaining samples.

It will be evident from the foregoing that the antioxidation stabilization effectiveness of the X-146 is less than that of any of the other stabilizers, but it suffers substantially no loss in tensile strength due to being exposed to 4.0 Mrad of gammas. Similar results are obtained with the other 3,5-DHPZNAs.

The foregoing tests for tensile strength were done by using three fibers (about enough to support a 10 lb weight before irradiation) at a time from each sample. After the skeins of fibers were irradiated, they were placed in the oven for aging. At intervals, three fibers were cut to about 2.5 inch lengths for clamping in the jaws of an Instron machine. Tensile strength was measured for a crosshead speed of 10 in/min and plotted vs days at 60° C. The sample was deemed to have failed when it lost 50% of its original strength.

Since non-woven and woven fabrics of PP fiber are typically used for only a short period of time under conditions such that their stability to oxidation is not as important a consideration as their stability to gamma irradiation, the X-146 is the stabilizer of choice if it is to be used by itself, with no other stabilizer.

In an analogous manner plaques and injection-molded dumb-bells were irradiated for 8 hr at a dosage rate of 0.5 Mrad/hr. The plaques were inspected for color and the dumb-bells were tested for tensile strength. A dumb-bell is mounted in the jaws of an Instron tester and tested as set forth in ASTM D-638. The tensile bars were drawn at an Instron crosshead speed of 2"/min using a jaw separation of 1". The Instron is operatively connected to a computer programmed to use the data from the test to generate a stress-strain curve. From the stress-strain curve for each sample, the computer calculates the break percent elongation by the formula set forth in D-638, and, "yield-work" the measure of which is the area under the curve up to the yield point.

The calculated values for break % elongation and yield work for dumb-bells were obtained for dumb-bells containing only X-146 in the indicated concentrations, before they were irradiated with gammas at the indicated dosage, immediately after they were irradiated, and, after they had been oven-aged. The break % elongation of nonirradiated dumb-bells was about 500% irrespective of the conc of X-146 in the samples. The break % elongations tabulated in Table 2 are those measured immediately after irradiation, and after 8 wks of oven aging at 60° C.

TABLE 2

| conc. phr | Dosage Mrad | Break % elong. after irradiation | |
|---|---|---|---|
| | | immed. after | after 8 wks |
| 0.1 | 3.5 | 82 | 6 |
| 0.2 | 3.5 | 25 | 0 |
| 0.2 | 5.0 | 13 | 0 |

In each case, the break % elongation at the end of 8 wks indicated that there was essentially no tensile strength, though the samples did not crumble and appeared to have strength.

Yield-work is found to be a useful measure of the amount of physical strength left in the specimen, and thus the level of stability imparted by the various stabilizers. In all cases the yield work was about 35% before irradiation but the values obtained after irradiation were too erratic to provide a reliable indication of strength. To the extent that the data can be interpreted, they appear to show that there is little yield-work percent change before and after irradiation, though the change in break % elongation appears to be large.

The yellowness index (YI) for each plaque, measured before and after irradiation is given in Table 3. A YI below 10 indicates that the plaque is essentially water-white, progressively showing more color as the number increases. A YI of 11 is barely yellow to the naked eye only when compared to a water-white specimen. The absolute yellowness as indicated by the YI is generally not of as great concern as the propensity of the YI to change. The absolute YI itself will depend upon such things as thickness of the material, the presence of other additives, the variation in wavelength of the light source, and the like.

TABLE 3

| conc. phr | Dosage Mrad | Yellowness Index after irrad'n | |
|---|---|---|---|
| | | immed. after | after 8 wks |
| 0.1 | 3.5 | 10.1 | 22.8 |
| 0.2 | 3.5 | 10.5 | 18.5 |
| 0.2 | 5.0 | 11 | not meaningful |

It will be evident that the Y.I. of the 0.2 phr sample was considerably better than at the 0.1 phr, but all samples were too poor to merit any serious consideration for general purpose stabilization against gammaradiation.

It will be recognized that the amount of stabilizer to be incorporated into the PP should be sufficient to attenuate all the oxidative degradation of the polymer, irrespective of the particular source of such degradation. An article subjected to both gamma- and ultraviolet light-radiation will tend to be oxidatively degraded by both so that the amount of stabilizer used should be greater than that used to attenuate its degradation due to only one of those sources.

As already pointed out, PP tends to disintegrate when the total dosage of gamma-radiation exceeds about 5 Mrad. For sterilization of the fibers, a total dosage in the range from about 0.5 to 5 Mrad, more preferably from about 1.5 to 3 Mrad, is generally delivered and accumulated by the fibers over a period of from about 1 minute to about. 12 hr, the most preferred rate being about 0.5 Mrad/hr.

We claim:

1. A method for imparting improved strength and discoloration resistance to stabilized, gamma-irradiated fibers which comprises incorporating into fibers of polypropylene homopolymer, or copolymers of propylene with a minor amount of ethylene, which fibers are essentially free of an antioxidant, an effective amount, sufficient to attenuate gamma-ray degradation of said fibers, of a N-(substituted)-1-(piperazine-2-one alkyl)-α-(3,5-dialkyl-4-hydroxyphenyl)- α, α-substituted acetamide ("3,5-DHPZNA") having a disubstituted alpha carbon atom, said 3,5-DHPZNA having the structure

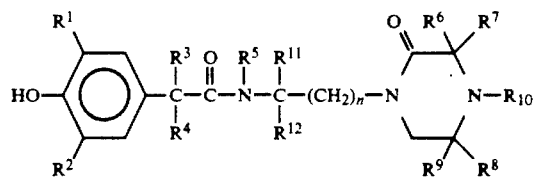

wherein, $R^1$, $R^2$ and $R^5$ each represent hydrogen, $C_1$–$C_{12}$ alkyl, phenyl, naphthyl, $C_4$–$C_{12}$ cycloalkyl, and, alkyl-substituted cycloalkyl, phenyl and naphthyl, each alkyl substituent being $C_1$–$C_8$, and at least one of $R^1$ and $R^2$ is t-$C_4$–$C_{12}$ alkyl;

$R^3$ and $R^4$ independently represent $C_1$–$C_{18}$ alkyl, and $C_5$–$C_{12}$ cycloalkyl, phenyl and naphthyl, and, alkyl-substituted cycloalkyl, phenyl and naphthyl, each alkyl substituent being $C_1$–$C_8$, and, when together cyclized, $R^3$ with $R^4$ may represent $C_4$–$C_{12}$ cycloalkyl, and $C_1$–$C_8$ alkyl-substituted cycloalkyl;

$R^6$, $R^7$, $R^8$ and $R^9$ each represent $C_1$–$C_{12}$ alkyl, or, when together cyclized, $R^6$ with $R^7$, and $R^8$ with $R^9$, may represent $C_4$–$C_{12}$ cycloalkyl, and $C_1$–$C_8$ alkyl-substituted cycloalkyl;

$R^{10}$ is selected from the group consisting of hydrogen, $C_1$–$C_8$ alkyl and

wherein $R^{13}$ represents hydrogen, $C_1$–$C_{18}$ alkyl or alkenyl, phenyl or naphthyl;

$R^{11}$ and $R^{12}$ independently represent hydrogen and $C_1$–$C_{18}$ alkyl; and, n is an integer in the range from 1 to about 8.

2. The method of claim 1 comprising irradiating said fibers with from about 0.5 to 5.0 Mrad of gamma radiation, accumulated over a period of from about 1 minute to about 12 hours, and, said 3,5-DHPZNA is specified by, n being 2 or 3;

$R^1$ being $C_1$–$C_8$ alkyl, $R^2$ is $C_1$–$C_5$ alkyl, $R^3$ and $R^4$ are each $C_1$–$C_8$ alkyl, and together, when cyclized represent cyclohexyl, methylcyclohexyl, cycloheptyl;

$R^5$ being $C_1$–$C_8$ alkyl; and, $R^{10}$ being hydrogen or $C_1$–$C_8$ alkyl.

3. The method of claim 2 wherein said 3,5-DHPZNA is specified by, at least one of $R^1$ and $R^2$ being t-butyl, or t-amyl; and, $R^3$ and $R^4$ being each $C_1$–$C_4$ alkyl.

4. The method of claim 2 wherein said 3,5-DHPZNA stabilizer is selected from the group consisting of
(1) N-isopropyl-N-[2-(2-keto-3,3,5,5-tetramethyl-1-piperazinyl)ethyl]-2-(3,5-di-t-butyl-4-hydroxyphenyl)-2-methyl-propanamide;
(2) N-[1-(2-keto-3,3,5,5-tetramethyl-1-piperazinyl-2-methyl-2-propyl]-2-(3,5-di-t-butyl-4-hydroxyphenyl)-2-methyl-propanamide;
(3) N-[1-(2-keto-3,5,5-trimethyl-3-ethyl-1-piperazinyl-2-methyl-2-propyl]-2-(3,5-di-t-butyl-4-hydroxyphenyl)-2-methyl-butanamide;
(4) N-[1-(2-keto-3,3-pentamethylene-5,5-dimethyl-1-piperazinyl)-2-methyl-2-propyl]-2-(3,5-di-t-butyl-4-hydroxyphenyl)-2,2-pentamethylene acetamide;
(5) N-[1-(2-keto-3,3,5,5-tetramethyl-1-piperazinyl-2-methyl 2-propyl]-2-(3,5-di-t-butyl-4-hydroxyphenyl)-2,2-pentamethylene acetamide;
(6) N-cyclohexyl-N-[2-(2-keto-3,3,5,5-tetramethyl-1-piperazinyl ethyl]-2-(3,5-di-t-butyl-4-hydroxyphenyl)-2,2-pentamethylene acetamide;
(7) N-cyclohexyl-N-[3-(2-keto-3,3,5,5-tetramethyl-1-piperazinyl propyl]-2-(3,5-di-t-butyl-4-hydroxyphenyl)-2,2-pentamethylene acetamide;
(8) N-cyclohexyl-N-[3-(2-keto-3,3,5,5-tetramethyl-1-piperazinyl-propyl]-2-(3,5-di-t-butyl-4-hydroxyphenyl)-2-methyl propanamide; and,
(9) N-cyclohexyl-N-[3-(2-keto-3,3,5,5-tetramethyl-1-piperazinyl-propyl]-2-(3,5-di-t-butyl-4-hydroxyphenyl)-2-methyl butanamide.

5. A method for sterilizing an article made from fibers of homopolypropylene, or a copolymer of propylene with a minor amount of ethylene, which method comprises, subjecting said article to gamma radiation in an amount sufficient to sterilize the article; said polypropylene homopolymer or copolymer being essentially free of an antioxidant, and having incorporated therein from 0.1 phr to about 5.0 phr, based upon the weight of the fiber in the article, of an acetamide having a disubstituted alpha carbon atom, said acetamide having the structure

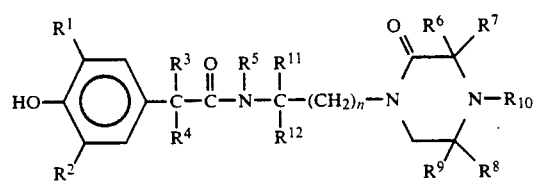

wherein, $R^1$, $R^2$ and $R^5$ each represent hydrogen, $C_1$–$C_{12}$ alkyl, phenyl, naphthyl, $C_4$–$C_{12}$ cycloalkyl, and, alkyl-substituted cycloalkyl, phenyl and naphthyl, each alkyl substituent being $C_1$–$C_8$, and at least one of $R^1$ and $R^2$ is t-$C_4$–$C_{12}$ alkyl;

$R^3$ and $R^4$ independently represent $C_1$–$C_{18}$ alkyl, and $C_5$–$C_{12}$ cycloalkyl, phenyl and naphthyl, and, alkyl-substituted cycloalkyl, phenyl and naphthyl, each alkyl substituent being $C_1$–$C_8$, and, when together cyclized, $R^3$ with $R^4$ may represent $C_4$–$C_{12}$ cycloalkyl, and $C_1$–$C_8$ alkyl-substituted cycloalkyl;

$R^6$, $R^7$, $R^8$ and $R^9$ each represent $C_1$–$C_{12}$ alkyl, or, when together cyclized, $R^6$ with $R^7$, and $R^8$ with $R^9$, may represent $C_4$–$C_{12}$ cycloalkyl, and $C_1$–$C_8$ alkyl-substituted cycloalkyl;

$R^{10}$ is selected from the group consisting of hydrogen, $C_1$–$C_8$ alkyl and

wherein $R^{13}$ represents hydrogen, $C_1$–$C_{18}$ alkyl or alkenyl, phenyl or naphthyl;

$R^{11}$ and $R^{12}$ independently represent hydrogen and $C_1$–$C_{18}$ alkyl; and, n is an integer in the range from 1 to about 8.

6. The method of claim 6 wherein the total dosage of said gamma-radiation is in the range from about 0.5 to 5.0 Mrad accumulated over a period of from about 1 minute to about 12 hours.

7. The method of claim 6 wherein said 3,5-DHPZNA stabilizer is selected from the group consisting of
(1) N-isopropyl-N-[2-(2-keto-3,3,5,5-tetramethyl-1-piperazinyl)ethyl]-2-(3,5-di-t-butyl-4-hydroxyphenyl)-2-methyl-propanamide;
(2) N-[1-(2-keto-3,3,5,5-tetramethyl-1-piperazinyl-2-methyl-2-propyl]-2-(3,5-di-t-butyl-4-hydroxyphenyl)-2-methyl-propanamide;
(3) N-[1-(2-keto-3,5,5-trimethyl-3-ethyl-1-piperazinyl-2-methyl-2-propyl]-2-(3,5-di-t-butyl-4-hydroxyphenyl)-2-methyl-butanamide;
(4) N-[1-(2-keto-3,3-pentamethylene-5,5-dimethyl-1-piperazinyl)-2-methyl-2-propyl]-2-(3,5-di-t-butyl-4-hydroxyphenyl)-2,2-pentamethylene acetamide;

(5) N-[1-(2-keto-3,3,5,5-tetramethyl-1-piperazinyl-2-methyl 2-propyl]-2-(3,5-di-t-butyl-4-hydroxyphenyl)-2,2-pentamethylene acetamide;

(6) N-cyclohexyl-N-[2-(2-keto-3,3,5,5-tetramethyl-1-piperazinyl ethyl]-2-(3,5-di-t-butyl-4-hydroxyphenyl)-2,2-pentamethylene acetamide;

(7) N-cyclohexyl-N-[3-(2-keto-3,3,5,5-tetramethyl-1-piperazinyl propyl]-2-(3,5-di-t-butyl-4 hydroxyphenyl)-2,2-pentamethylene acetamide;

(8) N-cyclohexyl-N-[3-(2-keto-3,3,5,5-tetramethyl-1-piperazinyl-propyl]-2-(3,5-di-t-butyl-4-hydroxyphenyl)-2-methyl propanamide; and, (9) N-cyclohexyl-N-[3-(2-keto-3,3,5,5-tetramethyl-1-piperazinyl-propyl]-2-(3,5-di-t-butyl-4-hydroxyphenyl)-2-methyl butanamide.

8. An article of manufacture of improved strength and discoloration resistance, formed from fibers of polypropylene or of a copolymer of propylene with a minor amount of ethylene, essentially free from an antioxidant, said polypropylene having incorporated therein as a stabilizer, an effective amount, sufficient to attenuate oxidative degradation of the polymer, of an acetamide having a disubstituted alpha carbon atom, said acetamide having the structure

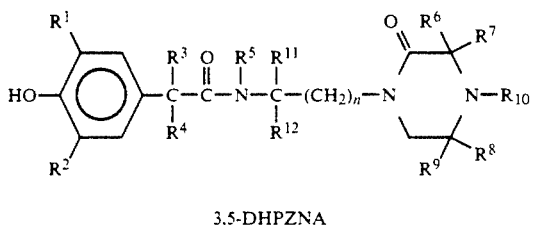

3,5-DHPZNA wherein, $R^1$, $R^2$ and $R^5$ each represent hydrogen, $C_1$–$C_{12}$ alkyl, phenyl, naphthyl, $C_4$–$C_{12}$ cycloalkyl, and, alkylsubstituted cycloalkyl, phenyl and naphthyl, each alkyl substituent being $C_1$–$C_8$, and at least one of $R^1$ and $R^2$ is t-$C_4$–$C_{12}$ alkyl;

$R^3$ and $R^4$ independently represent $C_1$–$C_{18}$ alkyl, and $C_5$–$C_{12}$ cycloalkyl, phenyl and naphthyl, and, alkyl-substituted cycloalkyl, phenyl and naphthyl, each alkyl substituent being $C_1$–$C_8$, and, when together cyclized, $R^3$ with $R^4$ may represent $C_4$–$C_{12}$ cycloalkyl, and $C_1$–$C_8$ alkyl-substituted cycloalkyl;

$R^6$, $R^7$, $R^8$ and $R^9$ each represent $C_1$–$C_{12}$ alkyl, or, when together cyclized, $R^6$ with $R^7$, and $R^8$ with $R^9$, may represent $C_4$–$C_{12}$ cycloalkyl, and $C_1$–$C_8$ alkyl-substituted cycloalkyl;

$R^{10}$ is selected from the group consisting of hydrogen, $C_1$–$C_8$ alkyl and

wherein $R^{13}$ represents hydrogen, $C_1$–$C_{18}$ alkyl or alkenyl, phenyl or naphthyl;

$R^{11}$ and $R^{12}$ independently represent hydrogen and $C_1$–$C_{18}$ alkyl; and, n is an integer in the range from 1 to about 8;

said article having been subjected to a dose of gamma-radiation.

9. The article of claim 8 wherein said substituted acetamide is selected from the group consisting of (1) N-isopropyl-N-[2-(2-keto-3,3,5,5-tetramethyl-1-piperazinyl)ethyl]-2-(3,5-di-t-butyl-4-hydroxyphenyl)-2-methyl-propanamide;

(2) N-[1-(2-keto-3,3,5,5-tetramethyl-1-piperazinyl-2-methyl-2-propyl]-2-(3,5-di-t-butyl-4-hydroxyphenyl)-2-methyl-propanamide;

(3) N-[1-(2-keto-3,5,5-trimethyl-3-ethyl-1-piperazinyl-2-methyl-2-propyl]-2-(3,5-di-t-butyl-4-hydroxyphenyl)-2-methyl-butanamide;

(4) N-[1-(2-keto-3,3-pentamethylene-5,5-dimethyl-1-piperazinyl)-2-methyl-2-propyl]-2-(3,5-di-t-butyl-4-hydroxyphenyl)-2,2-pentamethylene acetamide;

(5) N-[1-(2-keto-3,3,5,5-tetramethyl-1-piperazinyl-2-methyl 2-propyl]-2-(3,5-di-t-butyl-4-hydroxyphenyl)-2,2-pentamethylene acetamide;

(6) N-cyclohexyl-N-[2-(2-keto-3,3,5,5-tetramethyl-1-piperazinyl ethyl]-2-(3,5-di-t-butyl-4-hydroxyphenyl)-2,2-pentamethylene acetamide;

(7) N-cyclohexyl-N-[3-(2-keto-3,3,5,5-tetramethyl-1-piperazinyl propyl]-2-(3,5-di-t-butyl-4-hydroxyphenyl)-2,2-pentamethylene acetamide;

(8) N-cyclohexyl-N-[3-(2-keto-3,3,5,5-tetramethyl-1-piperazinyl-propyl]-2-(3,5-di-t-butyl-4-hydroxyphenyl)-2-methyl propanamide; and, (9) N-cyclohexyl-N-[3-(2-keto-3,3,5,5-tetramethyl-1-piperazinyl-propyl]-2-(3,5-di-t-butyl-4-hydroxyphenyl)-2-methyl butanamide.

10. The article of claim 9 wherein the total dosage of said gamma-radiation is in the range from about 0.5 to 5.0 Mrad accumulated over a period of from about 1 minute to about 12 hours.

* * * * *